1,953,750

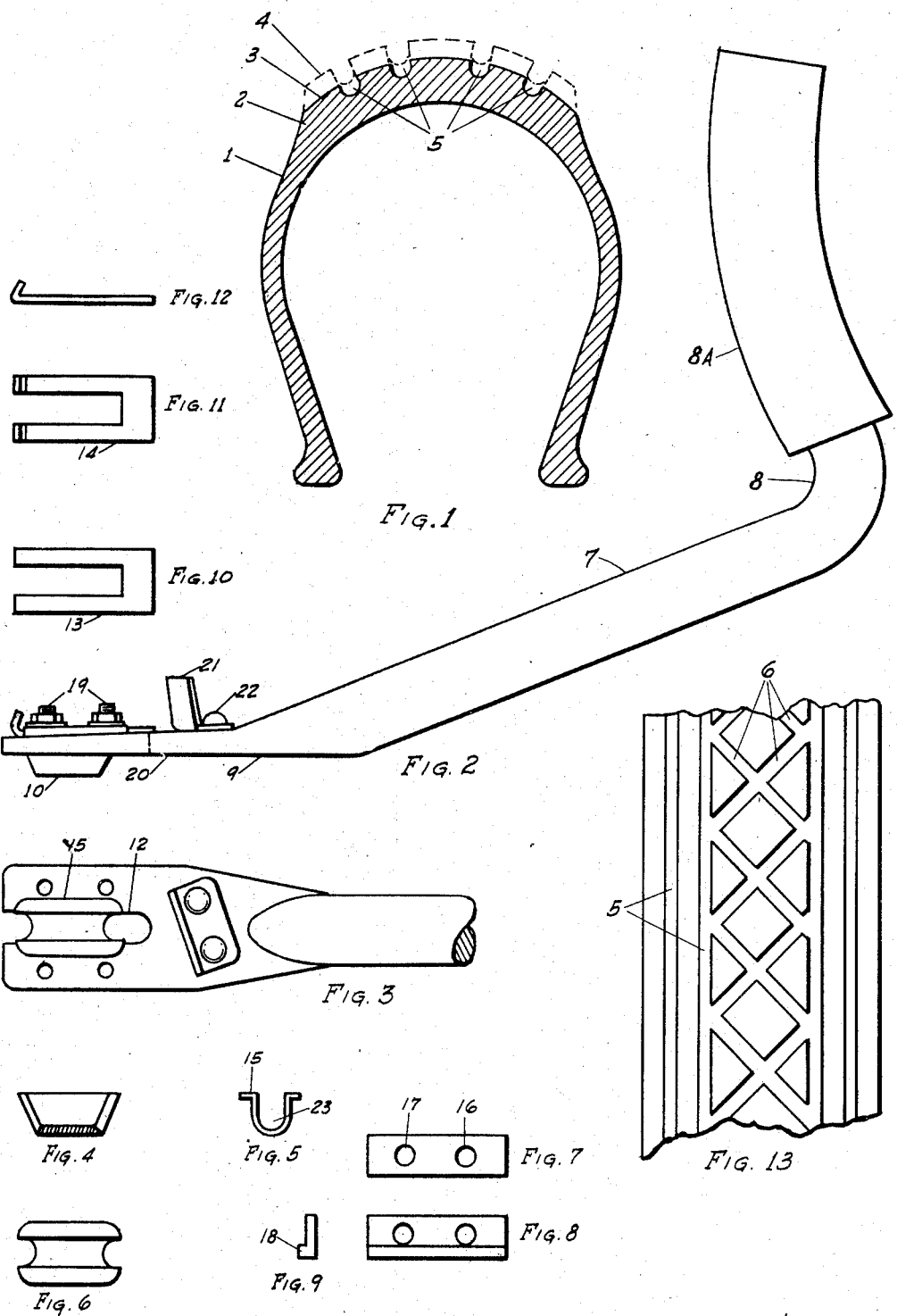

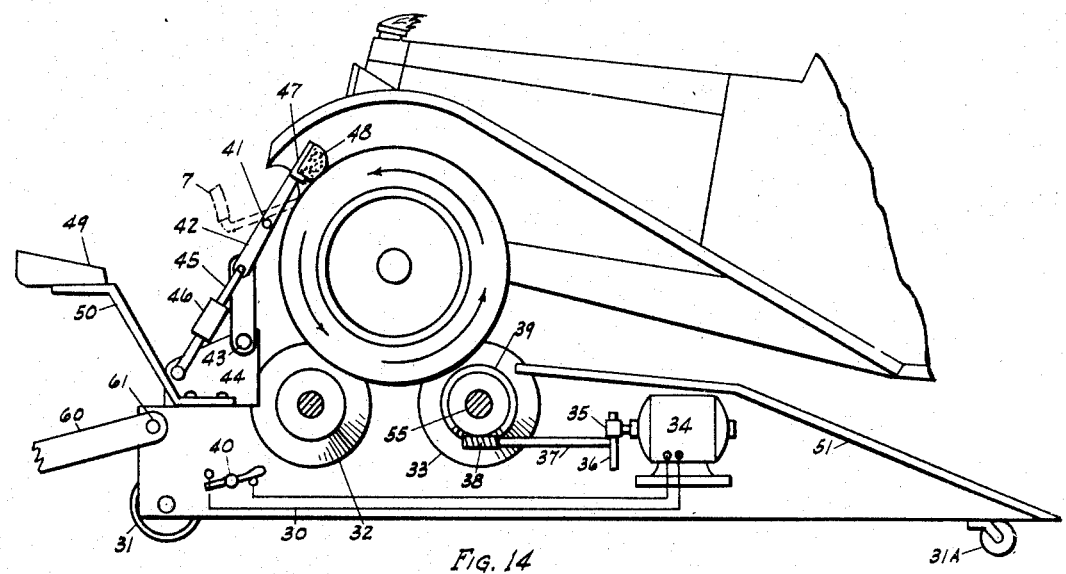
FIG. 14
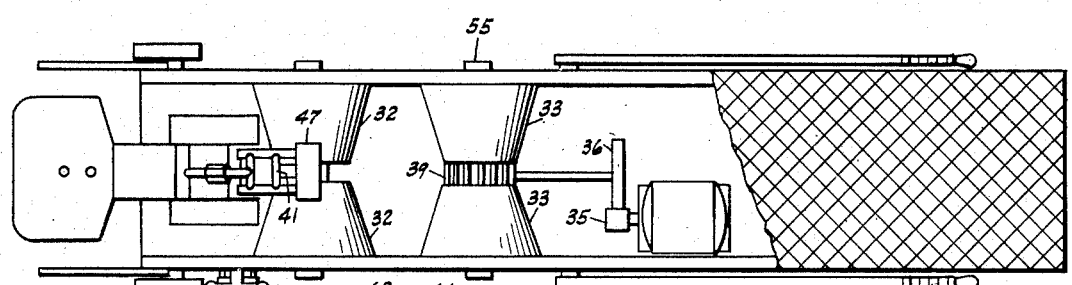
FIG. 15
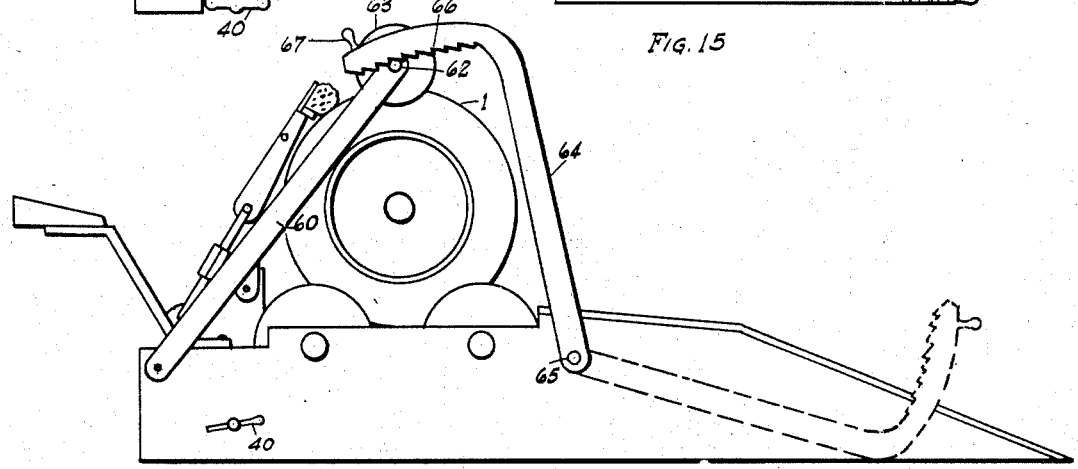
FIG. 16.
FIG. 17.
CHARLES H. DACON & VIRGIL STULTS
INVENTORS
BY George R. Ericson
ATTORNEY Patented Apr. 3, 1934

UNITED STATES PATENT OFFICE 1,953,750

METHOD OF RETREADING TIRES

Charles H. Dacon and Virgil Stults, St. Louis, Mo., assignors to St. Louis Tire Retreading Machine Company, St. Louis, Mo., a corporation of Missouri Original application March 10, 1932, Serial No. 597,988. Divided and this application December 17, 1932. Serial No. 647,780

6 Claims. (Cl. 164—17)

This application is a division of our copending application Serial #597,988 filed March 10, 1932 now Patent 1,894,347 granted January 17, 1933 for Apparatus for retreading tires and the invention relates to devices for retreading tires after the original tread has worn to a point where it is too smooth for safety. We know that it is old to apply new treads to tires which have been worn through, by cementing or vulcanizing a new and additional strip of rubber having a tread formed thereon to the smooth outer surface of the old tire, but this method is not satisfactory for the reason that the cement may not stick tightly, and the tread may be torn off by centrifugal force during high speed operation of the tire. Also, in applying such treads to the tire, it has been customary to vulcanize the tread on to the tires, and this reheating of the old rubber frequently causes serious injury which may result in a blowout.

It is also well known to place solid truck tires in a lathe or similar device for rotating the wheel and tire together and taking off a cut for the purpose of truing up the rubber of the tire after it has become unevenly worn. This method, however, is not applicable to passenger car or pneumatic tires because the rubber is comparatively thin and the slight irregularities in the circularity of the tire and wheel would be sufficient to cause the cutting tool to cut too deep in one side of the tire and not cut at all in the other. In most cases the depth of the tread on a pneumatic tire which may be safely cut after the tire has worn smooth, is approximately one-eighth of an inch and in some cases it may be as little as one-sixteenth of an inch. The wheel and rim on such a pneumatic tire may be an eighth of an inch out of round without causing any difficulties in operation of the automobile at all, but if we place such a wheel in a lathe and set the tool so as to cut one-eighth of an inch deep at one point in the tire, it will necessarily either cut a groove a quarter of an inch deep in the other side, thereby running into the fabric and ruining the tire, or it will miss altogether at one point leaving a smooth spot in the tread.

It is the object of this invention to provide a method of retreading tires in which the depth of the groove is gauged from the surface of the rubber as distinguished from gauging the depth of the groove from the center of the wheel.

It is a further object of this invention to provide a non-skid tread on the old tire by simply deepening or recutting the original groove formed in the tread without any heat treatment or cementing whatsoever and without the addition of any new rubber to the tire.

Other objects will appear from the following description and accompanying drawings, referring to which:

Figure 1 is a cross sectional view showing a tire which has become worn and which has been retreaded by our process.

Figure 2 shows a side elevation of a hand cutting tool which we have provided for recutting the tread.

Figure 3 shows a plan view of the knife holding portion of our cutting tool, the knife attaching nuts, shims, and cover plates having been removed for better illustration of the knife.

Figure 4 shows a side view of the knife.

Figure 5 shows an end view of the knife.

Figure 6 shows a plan view of the knife.

Figure 7 shows a plan view of one of the cover plates.

Figure 8 shows an inverted plan view of the cover plate shown in Figure 7.

Figure 9 shows an end view of the cover plate.

Figure 10 is a plan view of one of the shims used for adjusting the depth of cut.

Figure 11 is a plan view of another of the shims for adjusting the depth of the cut.

Figure 12 is a side view of the shim shown in Figure 11.

Figure 13 is a diagram showing one form of tread which may be cut with our device.

Figure 14 shows a diagrammatic side elevation of a tread cutting rack according to our invention, with the front end of an automobile on the rack.

Figure 15 shows a plan view of the rack.

Figure 16 shows a diagrammatic side elevation of the rack as used for cutting treads on tires which have been removed from the automobile, but left on the rim.

Figure 17 shows a blank rack to support the opposite side of the automobile.

The reference numeral 1 indicates the body of a tire having a tread portion 2 which has been worn down to the point indicated by the solid line 3. The original shape of the tire when new is indicated by the dotted lines 4, and the new grooves which we cut according to our process are shown in solid lines 5. It will be understood that the cross grooves 6, as shown in Figure 13, may be cut in any shape desired and preferably should conform to the original grooves in the tire, particularly if these grooves have not become so worn down that they are no longer visible.

The reference numeral 7 indicates the main body member of the retreading tool. This body member is preferably formed from a rod of cold rolled steel and comprises the shank portion 7, a bent up handle portion 8, and a tool holding portion 9 which is flattened out and formed at an angle to the shaft 7, as indicated in Figure 2. The handle is provided with a piece of rubber hose 8A for comfort in operating. It will be noted that the portion 9 is not only flattened, but slightly tapered so that one end will be thicker than the other. Preferably, the outer end is made thinnest. This is for the purposes of enabling the operator to make a fine adjustment of the depth of the groove by adjusting the cutting tool 10 longitudinally in the groove 12, and to give the tool a clearance with respect to the bottom of the groove.

The coarse adjustment of the depth of the tool may be made by inserting shims 13 and 14 either above or below the flanges 15 which are formed on the cutter. A cutter plate 16 formed with screw holes 17 and having a flange 18 is provided at each side of the flattened portion of the tool holder. The openings 17 receive studs 19 which are preferably brazed or welded to the separate prongs or sides of the flattened portion of the cutting tool.

The taper of the flattened portion causes the cutter to be held at an angle to the lower surface 20 of the flattened portion 9, and frequently the cutter is held at an angle to the bottom of the groove, so that enough clearance for free cutting is provided. The thumb rest 21 is suitably attached to the rear end of the flattened portion by rivets 22 or other suitable means.

The cutter comprises the flange 15 and the U-shaped cutting portion 23. The outer walls of the cutter are formed perfectly straight, and the inner walls are sharpened, as indicated in Figure 4, so that the sharpened portion will not interfere with the clearance between the tool and the bottom of the groove.

In order to conveniently cut grooves in tires of a vehicle without removing them from the automobile, we provide the cutting rack shown in Figures 14, 15, and 16. This rack comprises a frame 30 which may be mounted on rollers 31, and 31A, so that it will be conveniently moved from place to place. A pulling handle may be provided, if desired. The frame carries a pair of rolls 32 and 33 which may be grooved to center the wheel, as indicated. At least one of the rolls is driven by a motor 34 through a reduction gearing comprising a pinion 35 which is attached to the end of the motor shaft, gear 36 meshing with pinion 35, and shaft 37 to which are keyed the gears 36 and a worm 38 which meshes with worm gear 39 which is fixed to the roll 33.

The motor is controlled by a switch lever 40 and is arranged to be operated by the foot of the operator. A tool rest 41 comprising a horizontal bar is carried by a yoke 42 which is pivotally mounted, as at 43, to suitable supports 44 on the end of the frame. Yoke 42 is firmly held in position by a brace 45 which has one end pivoted to the yoke and the other pivoted to the supports 44. A turn buckle 46 is provided for adjusting the position of the yoke to the tool rest 41.

A sponge holder 47 is carried by the upper end of the yoke for the purpose of applying soap water or other lubricant to the tire as it approaches the cutting tool. A sponge 48 saturated in this lubricant may conveniently be used as an applicator.

A seat 49 is mounted on the frame by means of a support 50, so that the operator may conveniently sit while holding the cutting tool generally indicated by the reference numeral 7. The end of the frame opposite the seat is provided with an inclined track portion 51 of sufficient width, so that the automobile may be conveniently driven up on to the rack. This merely for the purpose of supporting the front wheel of the car as it is being driven on the rolls.

We have shown only one rack but, in most cases, both sides of one end of the car must be supported at the same level in order to bring the wheel into a vertical plane. In order to do this, another rack may be provided. Both racks may be separate or attached to each other and driven by the same motor, if desired. In which case, the shaft 55 of the roll 33 would extend from one rack to the other and drive the opposite roll. Also, a blank rack of any kind may be provided. This blank rack might be simply a block such as indicated in Figure 17. It should be noted that Figure 17 is drawn on a smaller scale than Figure 14, and the blank rack simply comprises the wedge 56 shown in perspective in that figure.

The reference numeral 60 indicates a pair of lateral supports which are pivoted as at 61 to the frame. These supports carry a cross shaft 62 at their upper ends, and a grooved roller 63 is mounted on the cross shaft. A pair of hooks 64 are pivotally carried at 65 on the sides of the frame. These hooks are provided with teeth, as indicated at 66, and a handle 67. When it is desired to cut a tire which is mounted on the rim and filled with air under pressure, but which is not on the automobile, the tire is placed in position, as shown in Figure 16, and the roller 63 is swung over and rested on top of the tire thus holding it in correct vertical position. The hooks 64 are then lifted to the position shown in solid lines in Figure 16 and driven backwardly so as to tightly engage the shaft 62, thus bringing the roller 63 down firmly on the tire to hold it in position. When it is desired to cut the tires without removing them from the automobile, the hooks 64 are freed from the shaft 62 with a hammer, and the hooks are then laid back in the position shown in dotted lines in Figure 16. The roll is then laid back to the position indicated in Figure 14. The hooks being on each side of the rack do not interfere with the wheel of the car as it is driven on to the rolls.

In the case of some makes of automobiles, it will be desirable to turn the steering gear sharply to the right or left to bring the front wheel out from under the fender. Inasmuch as this can not conveniently be done prior to driving the car on to the rolls, it is necessary to swing the rack around as the steering gear is turned, and I have provided casters 31A at at least one end of the rack for that purpose.

In operation, the tire is mounted in position on the rolls and held there either by the weight of the automobile or by the roller 63. The operator rests his tool on the cross member 41 and sets the motor 34 in operation in a direction such as to drive the tire in an anti-clockwise direction with reference to Figures 14 and 16. The circumferential grooves in the tire are quickly cut in this manner, and the cross grooves are cut by hand, the yoke 42 being removed, if desired, for this purpose.

We claim:

1. The method of retreading tires which consists in deepening the original grooves in the tread by cutting away a portion of the old rubber to a substantially equal depth with respect to the outer surface of the tire, regardless of the distance from the bottom of the groove to the center of the wheel on which the tire is mounted.

2. The method of retreading old tires which consists in holding the tire in a fixed plane, rotating the tire, and applying a cutting tool to the periphery thereof during rotation, gauging the depth of the groove from the outer surface of the tire, and thereby removing a narrow strip of rubber to form a groove of uniform depth in the tire.

3. The method of retreading old tires which consists in holding the tire in a fixed plane, rotating the tire, and applying a cutting tool to the periphery thereof during rotation, gauging the depth of the cut with respect to the surface of the rubber, thereby removing a narrow strip of rubber to form a groove in the tire, and then cutting cross grooves in the tread after the circumferential grooves have been formed.

4. The method of retreading pneumatic tires which consists in cutting grooves in the tread and gaging the depth of the grooves to substantially equal depth throughout the circumference of the tire with respect to the surface thereof and without regard to the circularity of the tire.

5. The method of retreading pneumatic tires which have become worn, which comprises removing a strip of rubber from the periphery of the tire and gaging the thickness of the strip removed from the worn surface of the tire itself and without regard to the circularity thereof.

6. The method of retreading tires which have become worn in use, which comprises forming grooves in the worn surface thereof and gaging said groves to be of substantially equal depth throughout the circumference of the tire regardless of irregularities in the circularity thereof.

VIRGIL STULTS.
CHAS. H. DACON.